Sept. 29, 1931.  E. L. CLEVELAND  1,825,052
HOT BEARING INDICATING MEANS
Filed Oct. 26, 1928
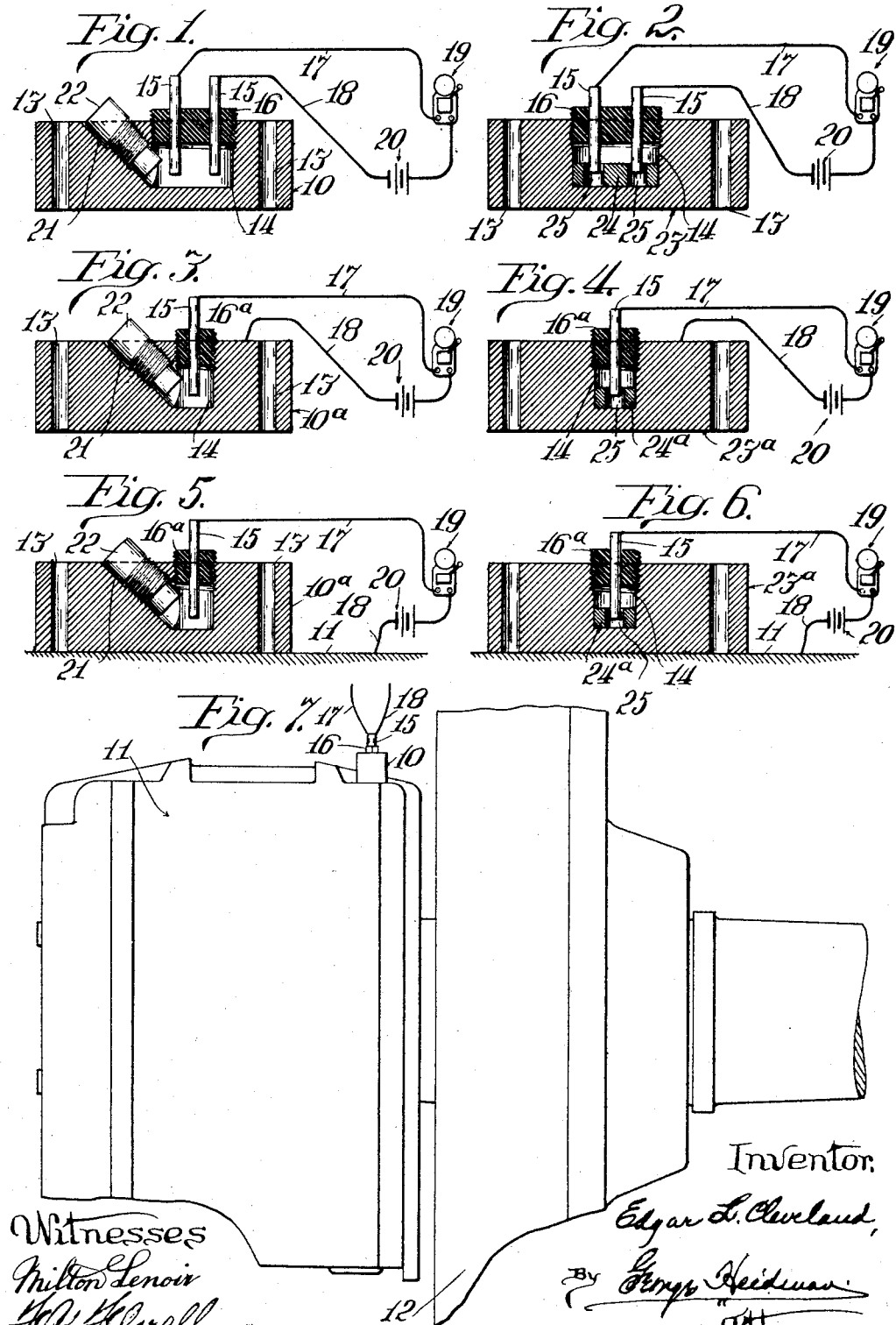

Patented Sept. 29, 1931

1,825,052

UNITED STATES PATENT OFFICE

EDGAR L. CLEVELAND, OF MOBRIDGE, SOUTH DAKOTA

HOT BEARING INDICATING MEANS

Application filed October 26, 1928. Serial No. 315,211.

My invention relates to means for indicating increase in temperature; being more especially intended for indicating hot bearings located in inaccessible places, and particularly for indicating hot journal bearings of the trucks of railroad cars and the like.

My invention has for its object means for giving an audible or visible indication when the temperature of the journal bearings reaches an undesirable degree, thus enabling such condition to be immediately noted and the condition to be rectified or taken care of.

I have illustrated my invention in the accompanying drawings as especially applicable for use on journal bearings of car trucks and the objects and advantages thereof will be readily apparent from the detailed description of the drawings, wherein—

Figure 1 illustrates one form of my improved means, without application to any bearing; portions being shown in section, and the electric circuit shown more or less diagrammatically.

Figure 2 is a similar view illustrating a modified form of the means disclosed in Figure 1.

Figure 3 is a substantially similar view of the means shown in Figure 1, but showing a modified form of the circuit.

Figure 4 is a substantially similar view of the means as shown in Figure 2, but illustrating a modification of the circuit arrangement.

Figure 5 is a view similar to Figure 3 showing another method of forming the electric circuit.

Figure 6 is a view similar to Figure 4 illustrating a modification of the circuit arrangement.

Figure 7 illustrates a general application of my improved means to the journal bearing of a railroad car; a portion of the wheel and journal being shown, with the journal-box shown in side elevation and my improved means applied thereto.

The invention, as disclosed in the drawings, comprises a metallic block 10 of suitable dimensions; the block 10 being of suitable heat conducting metal, such as copper, which is intended to be secured to the journal-box indicated at 11 in Figure 7 at a point where it will be near the hub or journal bearing of the wheel, partially indicated at 12.

It is apparent that any suitable location of the metallic or copper block 10 may be employed where the temperature or heat of the bearing will be readily transmitted to the block.

The block 10 is shown provided with openings as at 13, 13 to receive suitable fastening means for securing the block in place. The block is provided with a suitable recess or chamber 14 which is adapted to receive the electrodes or conductors 15 which are held in place by a suitable insulator such as bakelite or other electric insulating material indicated at 16, which may be threaded into the upper end of the recess or chamber 14 or otherwise suitably secured in place so as to hold the electrodes or conductors 15 out of contact with the block 10 and therefore slightly above the bottom of the recess or chamber 14.

The electrodes or conductors 15 in Figure 1 are secured to the ends of the wires or lead lines 17, 18; the lead lines or wires constituting an electric circuit which may involve a suitable alarm giving element such as a buzzer or bell indicated at 19 or any other proper indicating means which may be located at a proper accessible place removed from the bearing; the circuit also involving a battery as indicated at 20, or any other suitable source of electrical energy.

The block 10, adjacent to the chamber or recess 14 in Figure 1, is shown provided with a port or passage 21, the lower end whereof connects with the recess or chamber 14. This port or passage 21 is intended to receive a block of fusible material indicated at 22, such as rose metal, which will readily fuse or melt at a predetermined temperature.

The plug or fusing material may be secured in the port or passage 21 in any suitable manner, as for example by thread bead, dowel-pins or in any other manner whereby the plug will be held in its normal position out of contact with the lower end of the electrode or conductor.

With the means arranged as hereinbefore stated, and as shown for example in Figure 7, the heat from the bearing will be conducted to the heat conducting block of copper 10 and therefore to the fusing material 22 and if the bearing has reached the predetermined fusing temperature of the material 22, the latter immediately melts and flows into the bottom of the chamber or recess 14, allowing it to come in contact with the lower ends of the electrodes or conductors 15, thereby closing the electric circuit. Closing of the circuit, which involves the battery 20 or other suitable electrical energy, will induce operation of the indicating means, as for example of the signal or bell shown at 19.

In Figure 2 I illustrate a modification of the means shown in Figure 1. The modification disclosed in Figure 2, in so far as arranging the circuit, is the same as that shown in Figure 1; but instead of providing the heat transferring and electrode holding member or block 23, with a separate fusible material holding channel or port, the fusible material 24 is shown in the form of a substantially flat plug or plate inserted in the bottom of the chamber or recess 14.

In this construction, the plug or plate 24 is shown provided with recesses or holes 25, 25, adapted to receive the lower ends of the electrodes or conductors 15, 15, without normally contacting therewith.

As the block 23 becomes heated from the heat of the journal bearing or heat of the journal-box, the rose metal or fusible material 24 will melt, when the heat or temperature reaches a predetermined degree, and flow into contact with the lower ends of the two electrodes or conductors 15, 15, which are suitably held in place by the insulator 16.

When the fusible material contacts with the electrodes 15, 15, the electric circuit will be closed and the electrical energy will indicate this condition by any suitable indicating means arranged in the circuit, or sound the alarm indicated at 19.

Instead of employing a pair of electrodes or conductors 15, as in Figures 1 and 2, a single electrode or conductor 15 may be employed as shown in Figure 3. In this modification, the copper or heat conducting block 10ª is substantially similar to the block 10 shown in Figure 1, except that a smaller chamber or recess 14 is provided to receive a single electrode or conductor 15, which is held in proper position by the insulator 16ª, shown threaded into the orifice of the chamber or recess 14. In this construction, the rose metal or fusible material 22 is shown in the inclined port 21, as in Figure 1, so that when the heat transferred to block 10ª is sufficient to melt the material 22, it will flow down into the bottom of chamber 14 and contact with the electrode or conductor 15 and form a circuit through block 10ª to which the wire 18 is secured.

In Figure 4, I also illustrate the use of a single electrode as in Figure 3, applied to the arrangement disclosed in Figure 2, wherein the fusible material or rose metal 24ª is placed in the bottom of the chamber or recess 14 and is provided with a hole 25 to receive the lower end of the electrode or conductor 15 which is held in place by the insulator 16ª secured in the upper end of the recess 14 formed in the copper block 23ª.

In this construction, like in Figure 3, the wire 17 is secured to electrode 15 and leads to the bell or indicating element 19, while the other wire 18 is secured to the block 23ª and leads to the battery or other electrical energy 20.

In Figure 5, the arrangement is substantially like that shown in Figure 3, except that the wire 18 is grounded through a metallic portion of the truck or other element to which the copper plate or block 10ª is secured.

In Figure 6 I illustrate practically the same construction shown in Figure 4, except that wire 18, like in Figure 5, is attached to a metallic portion of the truck or other element to which the copper block 23ª is secured; and in Figure 7 I illustrate in a general way the application of my improved means.

It is apparent that the fusible material or rose metal element may be arranged either horizontally, vertically or at an inclination; it being essential that its arrangement be such that when the temperature reaches the predetermined melting temperature that the fusible material flow into contact with the electrode or electrodes to close the circuit.

It is also evident that my improved means, while especially applicable to the journal bearings of car trucks, may be employed to indicate hot bearings of any type and especially where such bearings are arranged at inaccessible places; and while the adaptations illustrated are believed to be the preferable forms, which have been described in terms employed merely as terms of description and not as terms of limitation, modifications may be made without, however, departing from the spirit of my invention.

What I claim is:—

In hot bearing indicating means, a block of heat conducting metal apertured to receive fastening means whereby the metal block may be secured to the journal bearings of railroad cars and provided with a cavity extending downwardly from the top of the block; current conducting means disposed into said cavity out of contact with the walls of the cavity; insulating means secured in the upper end of said cavity for holding said conducting means in place and for closing the orifice of the cavity; and a body of fusible material arranged in contact with the cavity wall so as to flow throughout the bottom of the cavity when fused and into contact with said current conducting means.

EDGAR L. CLEVELAND.